United States Patent
Duwe et al.

(10) Patent No.: US 6,718,466 B1
(45) Date of Patent: Apr. 6, 2004

(54) DATA MEDIUM WITH RESTORABLE ORIGINAL BASE DATA CONTENT, AND METHOD FOR ITS PRODUCTION

(75) Inventors: Arno Duwe, Wesel-Büderich (DE); Gregor Fox, Goch (DE); Erwin Koenen, Goch (DE); Heinz Schouten, Bedburg-Hau (DE)

(73) Assignee: Basis GmbH, EDV-Vertriebs-Gesellschaft (DE)

( * ) Notice: Subject to any disclaimer, the term of this patent is extended or adjusted under 35 U.S.C. 154(b) by 0 days.

(21) Appl. No.: 09/544,457

(22) Filed: Apr. 7, 2000

(30) Foreign Application Priority Data

Apr. 10, 1999 (EP) .............................. 99107058

(51) Int. Cl.$^7$ ................................ G06F 1/24
(52) U.S. Cl. ................. 713/100; 713/100; 714/100; 714/102
(58) Field of Search .............. 713/100; 714/100, 714/102

(56) References Cited

U.S. PATENT DOCUMENTS

| | | | | | |
|---|---|---|---|---|---|
| 4,586,027 A | * | 4/1986 | Tsukiyama et al. | ........... | 341/95 |
| 5,150,407 A | * | 9/1992 | Chan | ........... | 713/178 |
| 5,432,927 A | * | 7/1995 | Grote et al. | ........... | 713/2 |
| 5,471,606 A | * | 11/1995 | Huang et al. | ........... | 703/24 |
| 5,546,534 A | * | 8/1996 | Malcolm | ........... | 714/6 |
| 5,586,247 A | * | 12/1996 | Yoshifuji et al. | ........... | 714/2 |
| 5,642,496 A | * | 6/1997 | Kanfi | ........... | 711/162 |
| 5,657,473 A | * | 8/1997 | Killean et al. | ........... | 711/163 |
| 5,734,894 A | * | 3/1998 | Adamson et al. | ........... | 707/200 |
| 5,812,761 A | * | 9/1998 | Seki et al. | ........... | 714/54 |
| 5,963,717 A | * | 10/1999 | Imamura | ........... | 358/1.15 |
| 6,088,778 A | * | 7/2000 | Ruff et al. | ........... | 711/173 |
| 6,092,161 A | * | 7/2000 | White et al. | ........... | 711/163 |
| 6,167,494 A | * | 12/2000 | Cheston et al. | ........... | 711/162 |
| 6,195,695 B1 | * | 2/2001 | Cheston et al. | ........... | 709/221 |
| 6,317,755 B1 | * | 11/2001 | Rakers et al. | ........... | 707/204 |
| 6,363,487 B1 | * | 3/2002 | Schneider | ........... | 713/200 |

FOREIGN PATENT DOCUMENTS

| EP | 0 382 528 A | | 8/1990 | |
|---|---|---|---|---|
| JP | 403071752 | * | 3/1991 | ........... H04L/12/56 |
| JP | 07 065302 A | | 3/1995 | |
| JP | 02001045420 | * | 2/2001 | ........... H04N/5/78 |
| WO | WO 98 59296 A | | 12/1998 | |

* cited by examiner

*Primary Examiner*—Dennis M. Butler
*Assistant Examiner*—Nitin C Patel
(74) *Attorney, Agent, or Firm*—Cantor Colburn LLP

(57) ABSTRACT

For the purpose of providing a method for producing data media, and for providing such data media, by means of which both the need for reinstallation and the time required for restoring a given content to its pre-incompatibility state are minimized, this invention proposes a method for producing such a data medium with a restorable original base data content, whereby, in a section of the data medium designated as the active-data zone, an original base data content is generated, a separate section of the data medium is designated as the recovery zone, and a retrievable backup copy is saved from the active-data zone into the recovery zone.

9 Claims, 2 Drawing Sheets

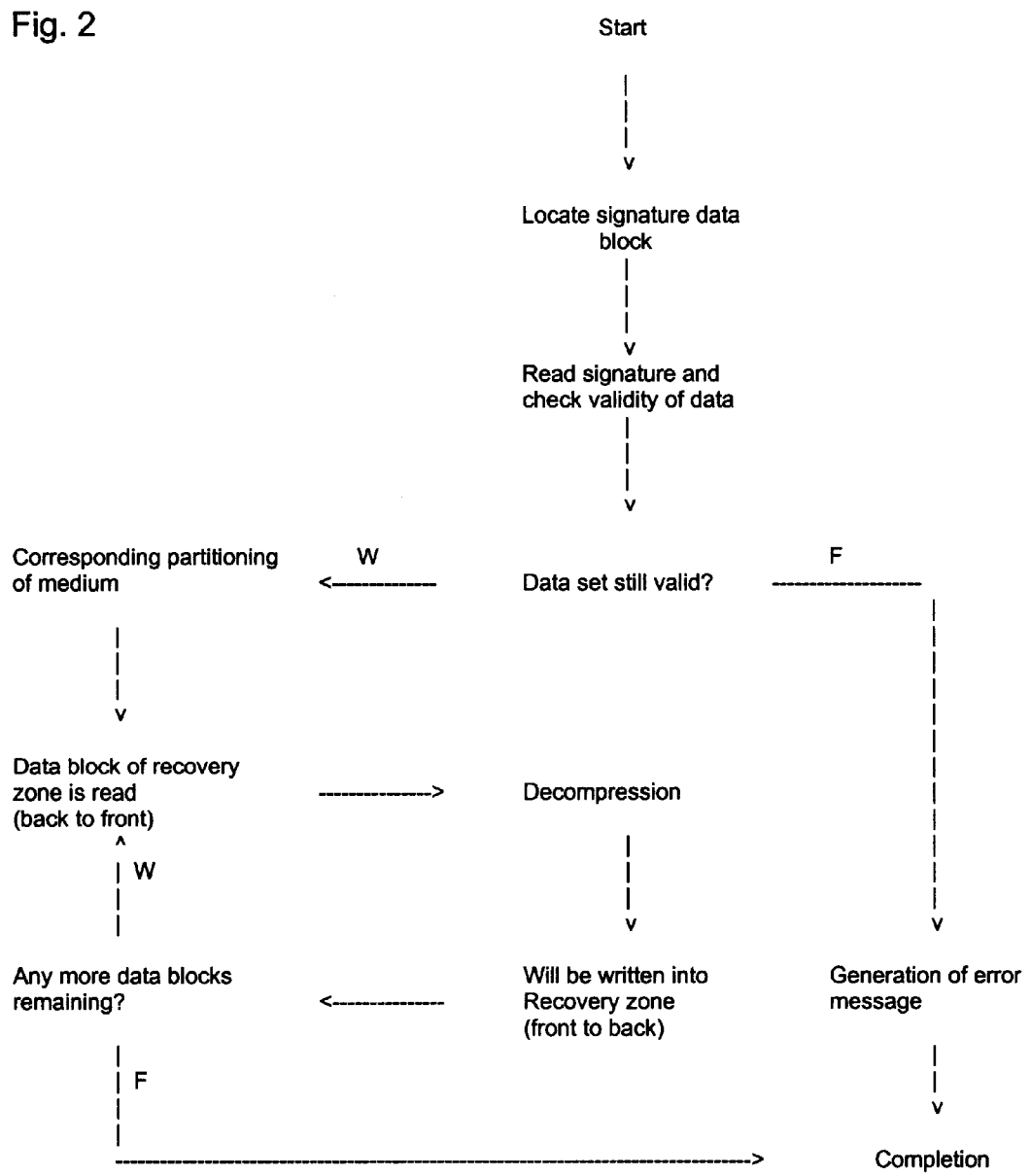

Figure 1:
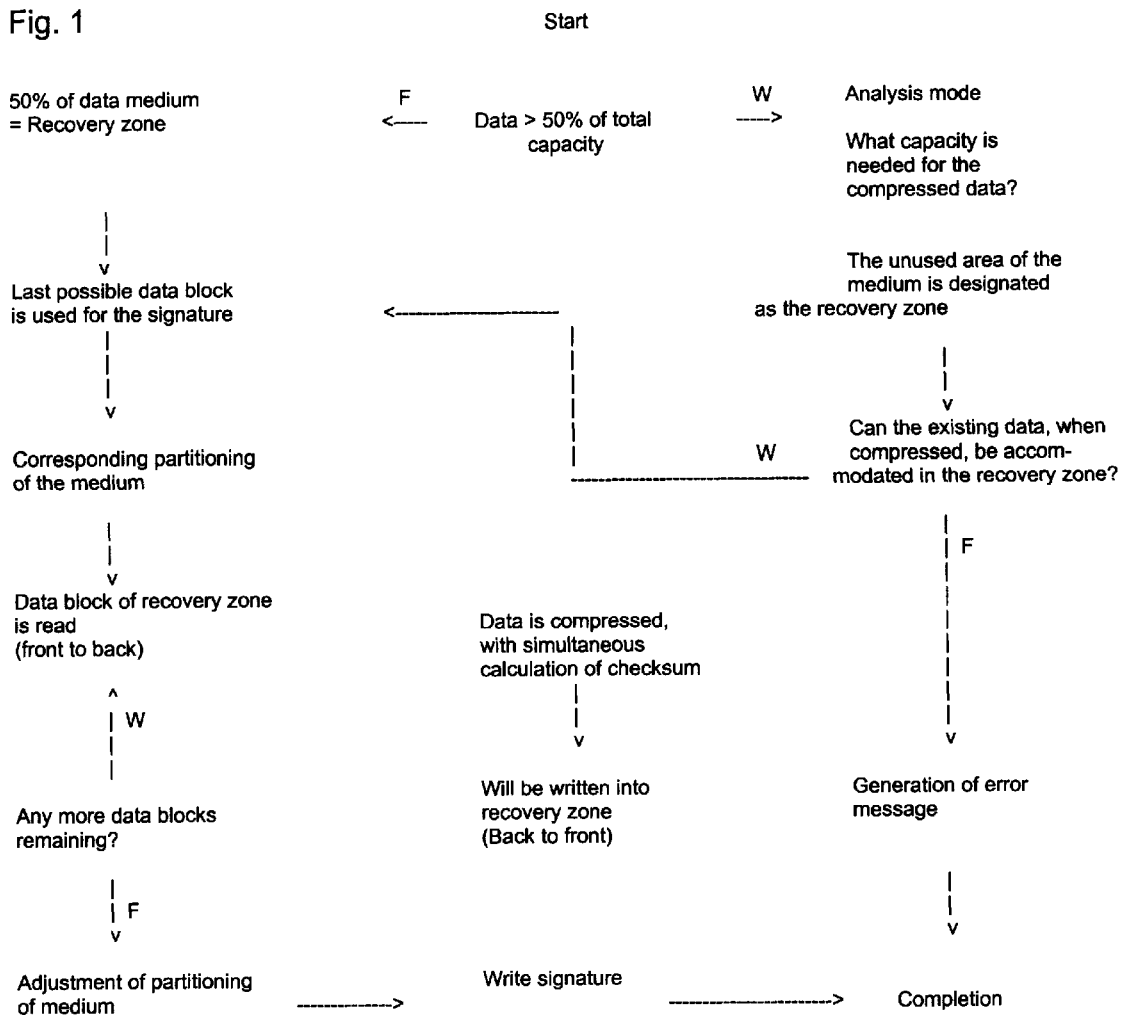

DATA MEDIUM WITH RESTORABLE ORIGINAL BASE DATA CONTENT, AND METHOD FOR ITS PRODUCTION

This invention relates to a method for producing a data medium permitting the restoration of the original base data content. The invention further relates to a novel data medium. The data media or storage media which are the object of this invention do not require linear data recording.

Storage or data media which do not require linear recording of the data have been on the market. They include diskettes, hard disks, DVD media and the like. This invention is not dependent on any particular operating or file system employed by the computer hardware with which the data media are used.

It is an accepted fact that modem operating systems and the basic installation of common applications software take up considerable storage space, typically several hundred megabytes. As a result, a significant amount of time must be spent until all components are properly installed and harmonized. Given the ever growing market and ever more voluminous and diverse computer applications, the system setup involves highly time-consuming steps before the data medium is formatted with the desired basic content.

However, the popular operating systems and application software programs are relatively vulnerable in terms of mutual compatibility. The mounting number of software products and possible mistakes made by users in their installation often lead to an incompatible state of programs and data.

Typically, the applications do not provide the possibility of undoing an installation 100%, apart from the fact that not all errors are immediately detected, ultimately making a complete reinstallation necessary. It is a known fact that the majority of all computer problems arise from the incompatibility of applications software, data etc., and that the attendant expenses for the user and for the industry are substantial.

Given the described state of the art, it is the objective of this invention to provide a method for producing data media, and a data medium itself, designed to minimize both the need for reinstallation and the time required to restore the original state and content that existed before any incompatibility was encountered.

As the procedural aspect of a technical solution, a method is proposed for producing a data medium with a restorable original base data content, whereby, in a field designated as the active-data zone, an original base-data content is created, a separate field of the data medium is assigned as the backup or recovery zone and a retrievable copy of the data in the active-data zone is saved in the recovery zone.

The hardware or firmware aspect of this invention is based on a data medium which is provided with at least one active-data zone and at least one recovery zone, allowing a copy of the contents of the active-data zone to be retrievably saved in the recovery zone.

The data media employed are preferably commercially available data media which by means of the method according to this invention are formatted into specific states. This invention thus makes it possible for an original base-data content selected as the desired installation state to be stored in a completely separate backup section of the data medium. In the event of changes to the contents of the active-data zone for instance by the installation of new applications or the like, whereby the content of the active-data zone is no longer sufficiently useful, meaning that the computer employing the data medium concerned no longer functions properly, it is a simple matter to restore to the active-data zone the data set saved in the recovery zone, reestablishing in the active-data zone its original base-data content. Appropriate functions can be integrated into the operating system or into the so-called BIOS of a computer. Suitable data compression allows for extremely rapid creation of the backup copy and for equally rapid retrieval. As part of that process, the so-called data link protocol is preferably saved in the recovery zone as well. Also included may be the corresponding compression and decompression software.

A particularly desirable conceptual aspect of this invention provides for the assignment of another zone storing the actual core information that organizes the data medium topology, meaning the so-called partitioning data which determine how many zones there are, in what basic format and for what purpose.

The method according to this invention thus allows for the production of data media which are prepartitioned and which in an appropriately designated recovery zone store a backup copy of the original base data content which, when the data medium is installed and used, is written into the active data zone for initialization. In other words, the data medium can be supplied completely formatted in a base installation mode that turns a computer into a device with a basic software content.

According to another aspect of this invention, error detection data are generated and stored, making it possible to determine whether the generation of a backup copy and/or the retrieval process was successful. To that end, check numbers are generated by means of which rewrite errors or damaged areas in the recovery zone can be detected. It is equally possible to use the error values for correcting incipient retrieval errors or dropouts in the recovery zone.

It is especially in the realm of mass distribution of computers that this invention offers advantages and new opportunities. Even uninitiated buyers are now in a position to restore their computer to the original delivery state where in the past it would have been impossible for them to rectify driver or other software problems. This minimizes customer complaints, it encourages users to perform the installation themselves and enables them to do so more reliably. By way of example, up to 50% of the data medium may be reserved as the recovery zone, but a smaller area can be used equally well, storing compressed data. Preferably, a blank area is left at the end of a data medium. The last data block may contain the so-called signature which in addition to its identifier may include for instance partitioning, file validity and similar data. In this case, the backup copy serves to write the individual data blocks, from last to first, in compressed fashion. The recovery zone is preferably identified as a partition which is not available for access by the operating systems, thus avoiding undesirable or accidental overwriting of this zone. As the backup is generated, a data checksum is calculated and is on its part entered in the last data block.

For retrieval, the signature is read first, following which the individual data blocks, decompressed where applicable, are written from first to last into the active data zone of the data medium. This rewrite process is controlled with the aid of the established checksum.

The method may be further refined by testing the data for defragmentation and by defragmenting the data in adaptation to the operating or file system used.

Other advantages and features of this invention are highlighted in the following description with reference to the diagrams in which:

FIG. 1 is a flow diagram showing an example of a sequence in which the backup copy is generated, and FIG. 2 is a flow diagram showing an example of a sequence for the retrieval and restoration process.

According to FIG. 1, the first step is to determine whether the data to be saved make up more than 50% of the overall capacity of the data medium. If that is the case, it is possible in the analysis mode to determine how much capacity the data would need if compressed. The unused space of the data medium is then allocated as the recovery zone. The next step serves to determine whether the compressed data can be accommodated in the recovery zone. If that is not the case, an error message is generated and the process is aborted.

If the initial check on whether the data would make up more than 50% of total capacity is negative, an area for instance of 50% of the data medium is assigned as the recovery zone. This is followed by the determination of the last possible data block for the signature.

Once the last possible data block for the signature has been located by whatever means, the data medium is suitably partitioned and a data block is read from the active data zone, compressed with simultaneous calculation of the checksum and written into the recovery zone. The reading of the data blocks takes place from front to back, the writing into the recovery zone takes place in reverse order. This process is continued for as long as any data blocks remain in the active-data zone. After the last data block has been read, compressed and saved, the partitioning of the data medium is suitably adapted and the signature is written, completing the process. The result is a data medium with an active-data zone, a separate, partitioned recovery zone and a signature segment.

For retrieval, the first step is to locate and read the signature data block and to check the data for their validity. If the data file is no longer valid, an error message is generated and the process is terminated. If the data set is valid, the next phase is the partitioning of the data medium. Next, the data blocks in the recovery zone are read, one by one from last to first, decompressed and then written into the active-data zone from first to last. This process is continued for as long as there remain saved data blocks, after which the process is complete. The result is the same data medium with a completely new, restored active-data zone, a recovery zone and the signature.

The implementation example described is intended purely for explanatory purposes and is not limiting in nature.

What is claimed is:

1. A method for producing a data medium having a restorable original base data content, the method comprising the steps of:

providing an active-data zone on said data medium in which an original base data content is stored;

providing a recovery zone on said data medium being a separated area of said data medium;

saving a retrievable backup copy from said original base data content stored in said active-data zone into said recovery zone;

providing another zone on said data medium being designated for storing the address and size information of at least the recovery zone; and wherein said original base data content is restorable in its entirety by restoring said retrievable backup copy of the recovery zone into said active-data zone.

2. The method as in claim 1, further comprising:

generating a new retrievable backup copy by redefining an original base data content.

3. The method as in claim 1, wherein said recovery zone is protected against the unintentional overwriting of data.

4. The method as in claim 1, wherein the protocol for the generation of the backup copy is stored ill tho recovery zone.

5. The method as in claim 1, wherein control data for error detection and error correction are created and stored during the generation of the backup copy.

6. The method as in claim 1, wherein compressing the data during generating of said backup copy.

7. The method as in claim 1, wherein saving data files for the original base data content.

8. The method as in claim 1, wherein saving operating-system data forming the original base data content.

9. A data medium having an adaptable partitioning whereby an active-data zone, a recovery zone and a third zone are provided on said data medium, all three zones being separated from each other whereby an original base data content is storage in said active-data zone, a retrievable backup copy of said active-data zone being provided with said original base data content is savable in said recovery zone, and address and size information of at least the recovery zone are storage in said third zone wherein said data medium enables said original base data content of said active-data zone being restorable in its entirety by restoring said retrievable backup copy of said recovery zone into said active-data zone.

* * * * *